United States Patent
Mayega et al.

(10) Patent No.: US 7,061,214 B2
(45) Date of Patent: Jun. 13, 2006

(54) SINGLE INDUCTOR DUAL OUTPUT BUCK CONVERTER WITH FREQUENCY AND TIME VARYING OFFSET CONTROL

(75) Inventors: Valerian Mayega, Dallas, TX (US);
Jun Chen, Allen, TX (US); James L. Krug, Carrollton, TX (US); David W. Evans, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 191 days.

(21) Appl. No.: 10/722,270

(22) Filed: Nov. 25, 2003

(65) Prior Publication Data

US 2005/0110471 A1    May 26, 2005

(51) Int. Cl.
    *G05F 1/577* (2006.01)
(52) U.S. Cl. ...................................... 323/267
(58) Field of Classification Search .......... 323/265, 323/267, 282
    See application file for complete search history.

(56) References Cited

U.S. PATENT DOCUMENTS

| | | | |
|---|---|---|---|
| 5,038,264 A * | 8/1991 | Steigerwald | 363/21.02 |
| 6,075,295 A * | 6/2000 | Li | 307/39 |
| 6,222,352 B1 | 4/2001 | Lenk | |
| 6,522,110 B1 | 2/2003 | Ivanov | |
| 2005/0105227 A1* | 5/2005 | Chen et al. | 361/82 |

* cited by examiner

*Primary Examiner*—Adolf Berhane
(74) *Attorney, Agent, or Firm*—J. Dennis Moore; W. James Brady, III; Frederick J. Telecky, Jr.

(57) ABSTRACT

A single-inductor dual-output buck converter and control method that facilitates power conversion by converting a single DC power source/supply into two separate DC outputs, each of which can be configured to provide a selected/desired voltage by selection of respective duty cycles. The topology of the inverter includes a pair of diodes or switches that can selectively re-circulate inductor current. The converter is generally operated at a fixed frequency with four stages of operation. A first and third stage of operation provide power to a first and second output, respectively. A second and fourth stage of operation re-circulate inductor current and can partially recharge a battery type power source. The power output for each stage (voltage and current) can be selectively obtained by computing and employing appropriate time periods for the stages of operation that correspond to appropriate duty cycles.

23 Claims, 17 Drawing Sheets

SINGLE INDUCTOR DUAL OUTPUT BUCK CONVERTER WITH FREQUENCY AND TIME VARYING OFFSET CONTROL

FIELD OF THE INVENTION

The present invention relates generally to power conversion, and more particularly, to systems and methods for operating a single inductor dual output buck converter with fixed frequency and time varying offset control.

BACKGROUND OF THE INVENTION

Switching power supply circuits are utilized in a number of different circuit applications. There are three basic switching power supply topologies in common use; buck converter, boost converter, and buck boost converter. These topologies are generally non-isolated, that is, the input and output voltages share a common ground. There are, however, isolated derivations of these non-isolated topologies. The differing topologies refer to how the switches, output inductor and output capacitor associated therewith are interconnected. Each topology has unique properties that include the steady-state voltage conversion ratios, the nature of the input and output currents, and the character of the output voltage ripple. Another property is the frequency response of the duty cycle-to-output voltage transfer function.

A single output buck converter topology is also referred to as a buck converter, buck power stage or a step-down power stage (because the output is always less than the input). The input current for a buck power stage is said to be discontinuous or pulsating if a switching current pulses from zero or some negative value to some positive output current value every switching cycle. The output current for a buck power stage is said to be continuous or non-pulsating because the output current is supplied by an output inductor/capacitor combination. In the latter event, the inductor current never reaches a zero or negative value.

An exemplary basic buck converter circuit is illustrated in prior art FIG. 1A, and designated at reference numeral 10. When a power switch 12 is activated, the switch behaves like a closed circuit, as illustrated in prior art FIG. 1B, and the input voltage VIN is applied to an inductor 14, and power is delivered to an output load 16. The output load voltage is VOUT=VIN−VL, wherein the VL, the voltage across the inductor 14, is given by L(di/dt). The output voltage VOUT also is formed across a capacitor 18, thus the capacitor charges and the output voltage increases each time the switch 12 is closed.

When the switch 12 is deactivated, or turned off, the switch 12 behaves as an open circuit, as illustrated in prior art FIG. 1C, and the voltage across the inductor 14 reverses due to inductive flyback, thus making a circuit diode 20 forward biased. The circuit loop generated by the diode 20 allows the energy stored in the inductor 14 to be delivered to the output load 16, wherein the output current is smoothed by the capacitor 18. Typical waveforms for a buck converter are shown in FIG. 2. The power switch 12 is switched at a relatively high frequency (e.g., between about 20 KHz and about 300 KHz for most converters) to produce a chopped output voltage, however, the inductor 14 and capacitor 18 together operate as an LC filter to produce a relatively smooth output voltage having a DC component with a small ripple voltage overlying the DC value (see, e.g., output voltage waveform of FIG. 2). The ripple voltage can be controlled by varying the duty cycle of the power switch control voltage.

The base principle of operation in the above buck converter 10 is often utilized in hysteretic dc-dc converters, as illustrated in prior art FIG. 3, and designated at reference numeral 30. The circuit 30 is similar in various respects to the buck converter 10 of FIG. 1A and employs a unity gain buffer 32 serially coupled to an analog comparator circuit 34 having a hysteresis VH. The comparator 34 compares the input reference voltage VREF to the circuit output voltage VOUT and provides an output signal at node 36, which is a function of the comparison and constitutes a generally square wave. An exemplary output voltage waveform for the circuit 30 is illustrated in FIG. 4.

The hysteresis VH of the comparator 34 impacts the operation of the circuit 30 in the following manner. As the output VOUT falls below a voltage VREF−VH, the comparator 34 trips and the output thereof at node 36 goes from zero to the supply, ideally, which then is fed to the circuit output VOUT (wherein, VOUT is a function of the output of the comparator and the duty cycle of the driver). Similarly, as VOUT increases to a voltage VOUT+VH, the comparator 34 again trips and the output thereof at node 36 decreases to zero volts, which is fed to the circuit output VOUT. Therefore the hysteresis VH of the comparator 34 dictates an amount of voltage ripple (2*VH) about the target reference voltage VREF, as illustrated in FIG. 4, and, in conjunction with the output capacitor dictates a natural frequency of the ripple voltage at the output VOUT.

Single output buck converters work well in applications and/or devices that employ a single input voltage. However, some applications and/or devices utilize two power sources. For example, a digital signal processor (DSP) generally employs two power supplies; one power supply (1.8V) is to power an I/O ring and the other (1.2V) is to power a digital core. Dual voltage outputs of the power converter are also reported to reduce power dissipation. Two single output buck converters can be employed in such instances, but at a relatively high cost in terms of power utilization, area utilization, and component costs. Typically, inductors are the highest cost component and employing two buck converters requires two inductors. Additionally, more switches are then employed, which can result in greater power consumption.

Single inductor dual output converters are available, but have limited output power availability. Conventional control algorithms that are used to operate these converters result in relatively high peak-to-peak currents that increase output voltage ripple for both outputs and also increase electromagnetic interference (EMI) radiation, which reduces their suitability for wireless applications. Furthermore, the control of one output often interferes with the control of a second output, particularly at full output load currents. This interference is also referred to as cross talk.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates power conversion by providing systems and methods for controlling a single inductor dual output buck converter. The present invention facilitates sourcing of high output currents, with relative peak-to-peak currents being small as a result of a continuous mode of operation. Additionally, the present invention provides a "current on demand" feature. The systems and methods mitigate cross talk and employ battery current recirculation thereby reducing energy consumption and improving efficiency. The present invention employs an OFFSET ramp generation scheme that allows each output to have complete un-truncated duty cycles when both outputs are at full load.

The present invention includes a single inductor dual output buck converter that can re-circulate current during non-power providing periods. The topology of the inverter includes a pair of diodes or switches that selectively re-circulate inductor current. The converter is generally operated at a fixed frequency with four stages of operation. A first and third stage of operation provide power to a first and second output, respectively. A second and fourth stage of operation re-circulate inductor current and can partially recharge a battery type power source. The power output for each stage (voltage and current) can be selectively obtained by computing and employing appropriate time periods for the stages of operation that correspond to appropriate duty cycles.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

The present invention facilitates power conversion by providing systems and methods for controlling a single inductor dual output buck converter. The present invention facilitates sourcing of high output currents, with relative peak-to-peak currents being small as a result of a continuous mode of operation. Additionally, the present invention provides a "current on demand" feature. The systems and methods mitigate cross talk and employ battery current re-circulation thereby reducing energy consumption and improving efficiency. The present invention employs an OFFSET ramp generation scheme that allows each output to have complete un-truncated duty cycles when both outputs are at full load.

The present invention includes a single inductor dual output buck converter that can re-circulate current during non-power providing periods. The topology of the inverter includes a pair of diodes or switches that selectively re-circulate inductor current. The converter is generally operated at a fixed frequency with four stages of operation. A first and third stage of operation provide power to a first and second output, respectively. A second and fourth stage of operation re-circulate inductor current and can partially recharge a battery type power source. The power output for each stage (voltage and current) can be selectively obtained by computing and employing appropriate time periods for the stages of operation that correspond to appropriate duty cycles.

Switch mode buck converters have become popular due to two attractive features: first, they are more efficient than traditional low drop out regulators (LDO) (e.g., up to 95%) and second, they can provide relatively high currents with lower power dissipation on chip than an LDO can. However, buck converters can have relatively costly components, which can include an inductor, capacitor, and/or a Schottky diode.

As the demand for integration and system on chip (SOC) solutions increase, the exploration of power management integrations in deep sub-micron becomes useful. The SOC solutions usually require more than one power source/supply operating at different voltages. In wireless cell phone platforms, where battery life is important, voltage regulators are desired to be relatively efficient. However, the SOC solutions, being cost sensitive, cannot afford the cost of extra external components for multiple switching power supplies (the most expensive component being an inductor).

Figure 1A:
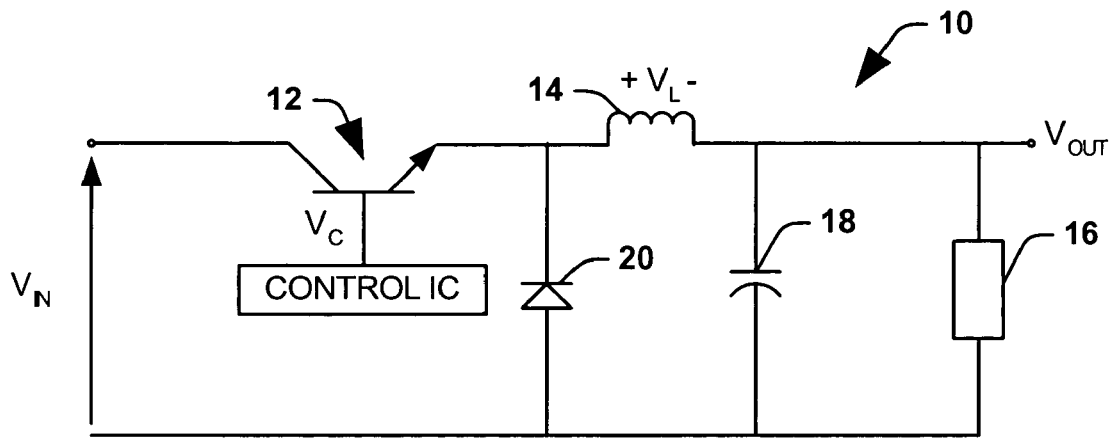
FIG. 1A is a schematic diagram illustrating an exemplary basic buck converter.
Figure 1B:
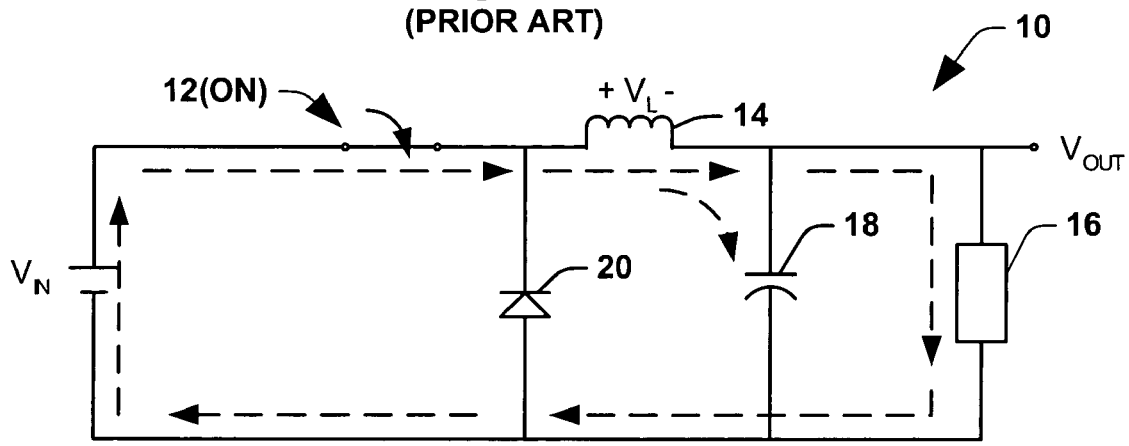
FIG. 1B is a schematic diagram illustrating operation of the exemplary buck converter.
Figure 1C:
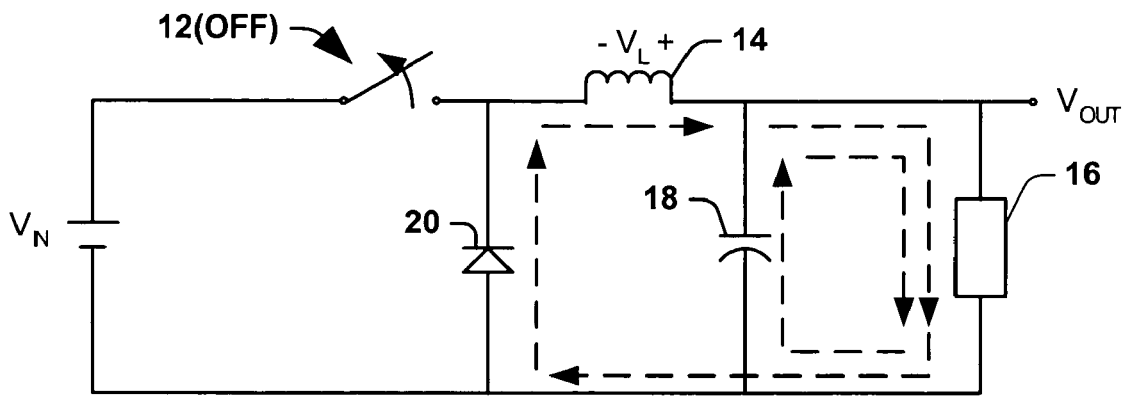
FIG. 1C is a schematic diagram further illustrating operation of the exemplary buck converter.
Figure 2:
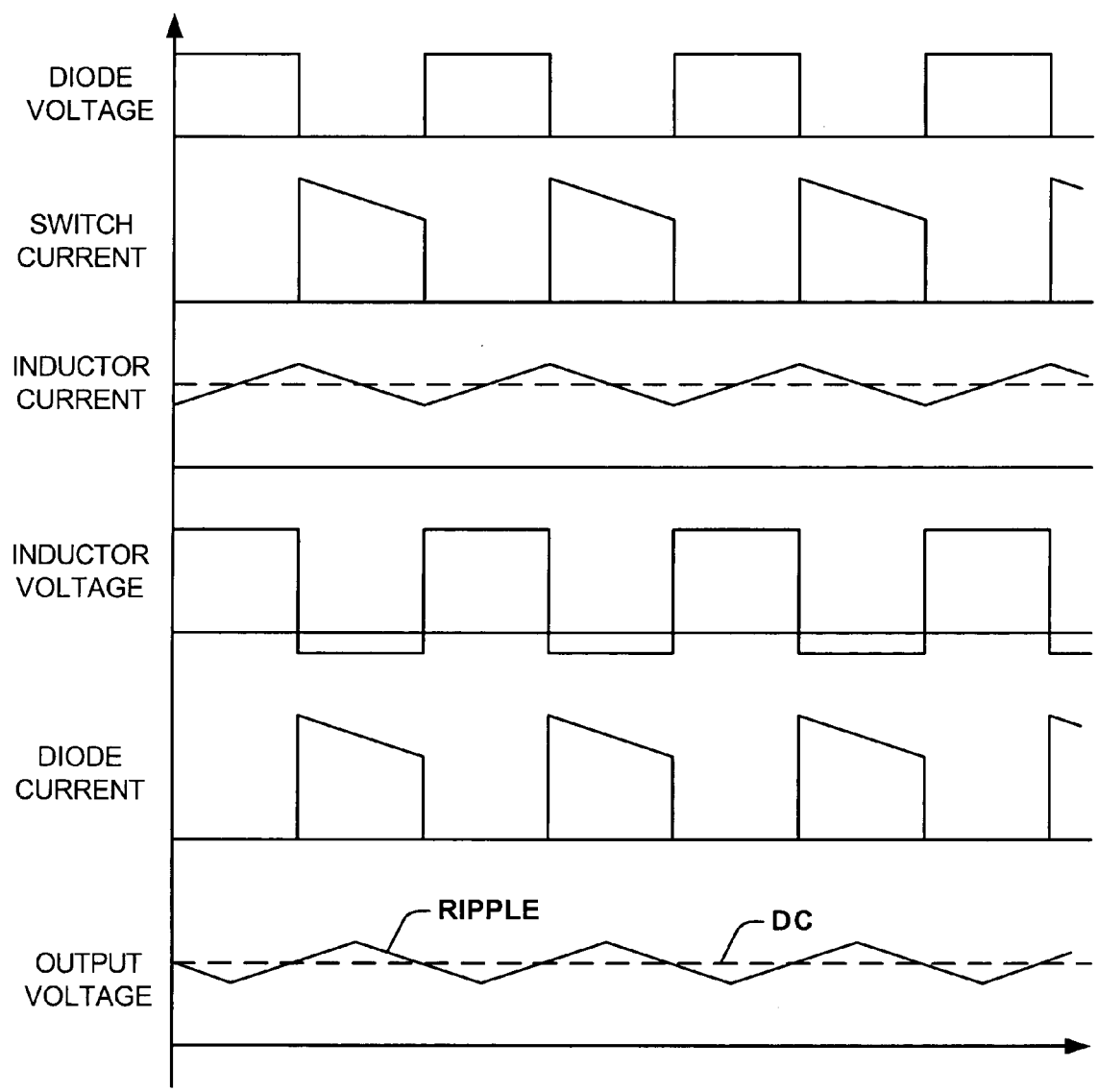
FIG. 2 is a graph illustrating typical waveforms for the exemplary buck converter.
Figure 3:
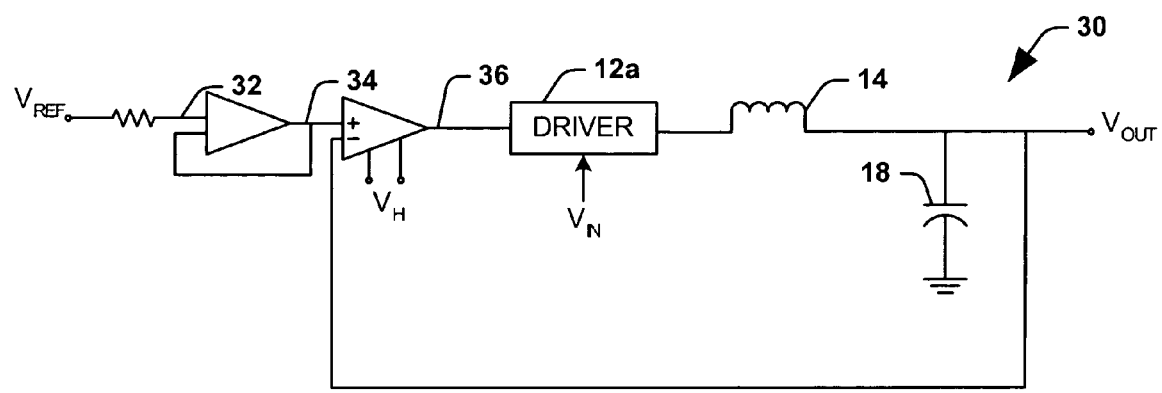
FIG. 3 is a diagram illustrating base operation of the exemplary buck converter.
Figure 4:
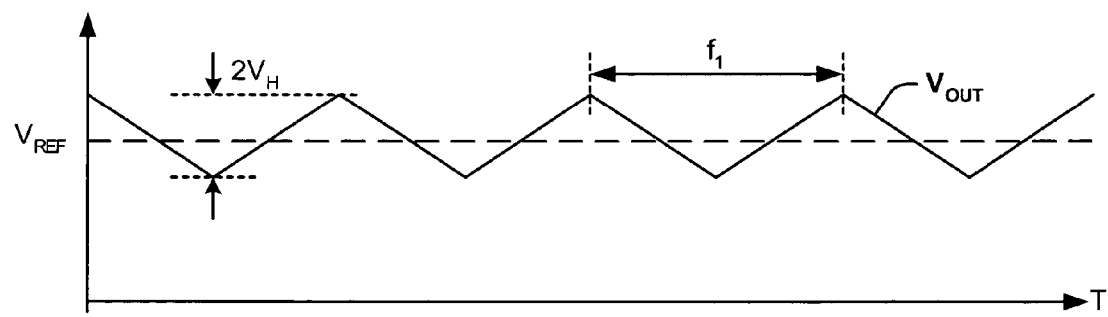
FIG. 4 is a graph illustrating an exemplary output voltage waveform.
Figure 5:
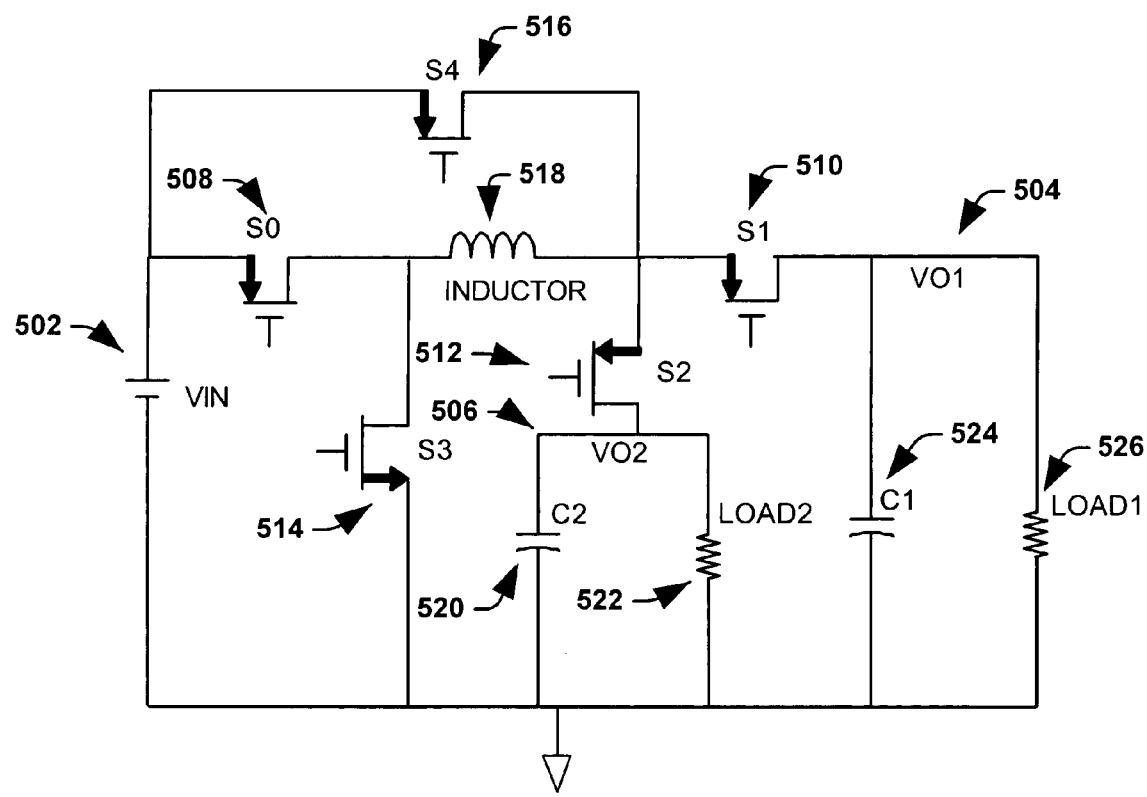
FIG. 5 is a schematic diagram illustrating a single inductor dual output buck converter in accordance with an aspect of the present invention.

Beginning with FIG. 5, a schematic diagram of a single inductor dual output buck converter in accordance with an aspect of the present invention is provided. The converter is operable to controllably provide multiple output voltages from a single input power source. Desired output voltage levels can be obtained by selection of component parameters and control and operation of the converter during use.

The converter, during operation, receives an input power source/supply 502 (VIN) and provides a first output 504 (VO1) and a second output 506 (VO2). The converter includes a single inductor 518 and five controllable switches, a first switch 508 (S0), a second switch 510 (S1), a third switch 512 (S2), a fourth switch 514 (S3), and a fifth switch 516 (S4). The fourth switch 514 and the fifth switch 516 are employed for re-circulation purposes and can be replaced with diodes in alternate aspects of the present invention. The first output 504 includes a first capacitor 524 and a first load 526, in parallel, and the second output 506 includes a second capacitor 520 and a second load 522, also in parallel.

The converter employs synchronous rectification in order to improve efficiency. Additionally, current re-circulation is applied to the power source 502 instead of one or both of the outputs 504 and 506, which can reduce cross talk from memory current remaining in the inductor 518 from a previous stage. Additionally, if output current requirements of both outputs 504 and 506 are satisfied, the current remains in battery re-circulation mode and the energy of the inductor can be provided to power support circuitry.

The first switch 508 controllably connects a positive terminal of the power source 502 to the inductor 518 (a first terminal of the inductor 518). The second switch 510 controllably connects a second terminal of the inductor 518 to the first output 504 and the third switch 512 controllably connects the second terminal of the inductor 518 to the second output 506. The fourth switch 514 controllably connects the first terminal of the inductor 518 to ground and the fifth switch 516 controllably connects the second terminal of the inductor 518 to the positive terminal of the power source 502.

Figure 6:
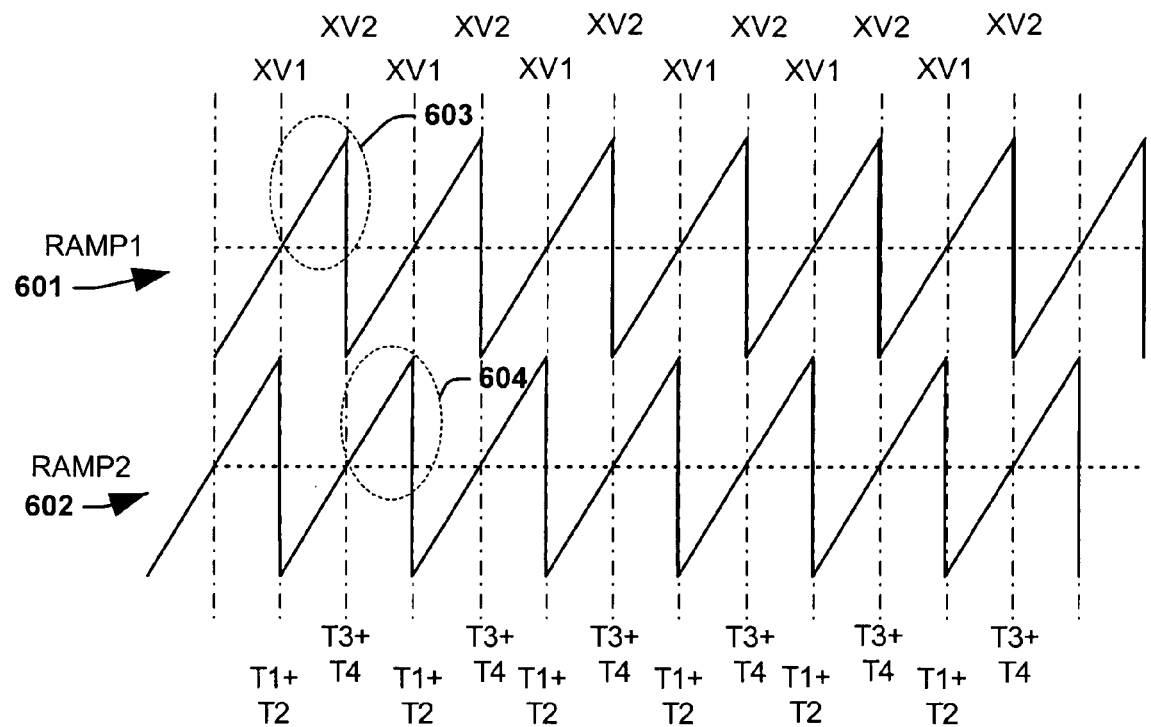
FIG. 6 is a graph illustrating two exemplary ramp signals that can be employed in accordance with an aspect of the present invention.

The converter is controlled by using two ramp signals and by offsetting the signals by a predetermined and calculated factor, which with the feedback signals of the respective outputs operates the converter in four stages of operation. FIG. 6 is a graph illustrating two exemplary ramp signals that can be employed in accordance with an aspect of the present invention. A first ramp (RAMP1) signal 601 is the cycle which when positive, power is supplied to the second output 506, and a second ramp signal (RAMP2) 602 is the cycle in which when positive power is supplied to the first output 504. The ramp signals 601 and 602 are generated by signal generators (not shown) and provided to comparators along with respective feedback signals of VOUT1 and VOUT2 that drive logic and a driver that operates the switches of the converter. Generally, when the first ramp signal is positive 603, the switches are controlled and/or configured to operate the converter in third and fourth stages of operation according to time periods T3 and T4, respectively. Similarly, when the second ramp signal is positive 604, the switches are controlled and/or configured to operate in first and second stages of operation according to time periods T1 and T2, respectively. The four stages of operation are described below with respect to FIGS. 7, 8, 9, and 10.

Figure 7:
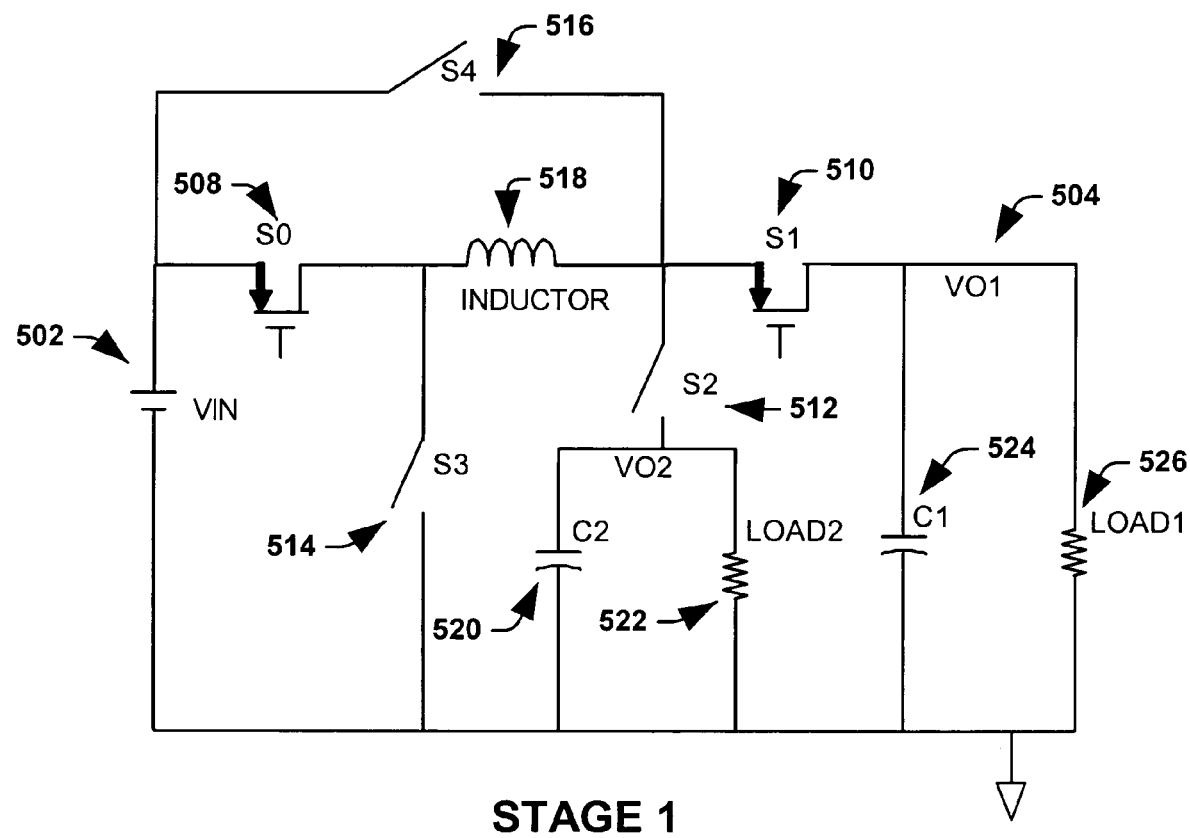
FIG. 7 is a schematic diagram illustrating the buck converter of FIG. 5 in a first stage of operation in accordance with an aspect of the present invention.

FIG. 7 is a schematic diagram illustrating the buck converter of FIG. 5 in a first stage of operation in accordance with an aspect of the present invention. In this stage, the first switch 508 and the second switch 510 are turned ON and the third switch 512 is turned OFF. The re-circulation switches (514 and 516) are also turned OFF for this stage. Accordingly, the power source 502 supplies power/current that flows through the inductor 518 and charges the first capacitor 524 and supplies power to the first load 526. This operation corresponds to the converter working in the top half 603 of the first ramp 601. A duty cycle or operation time for this stage in this example is less than 50% and the first output 504 is turned ON during this stage but is turned OFF at the end of the positive portion of the first ramp 601. However, it is appreciated that the duty cycle can be adjusted to have other suitable values, described infra, and still be in accordance with the present invention. The converter remains in this stage until output power requirements for the first load 526 are attained.

Figure 8:
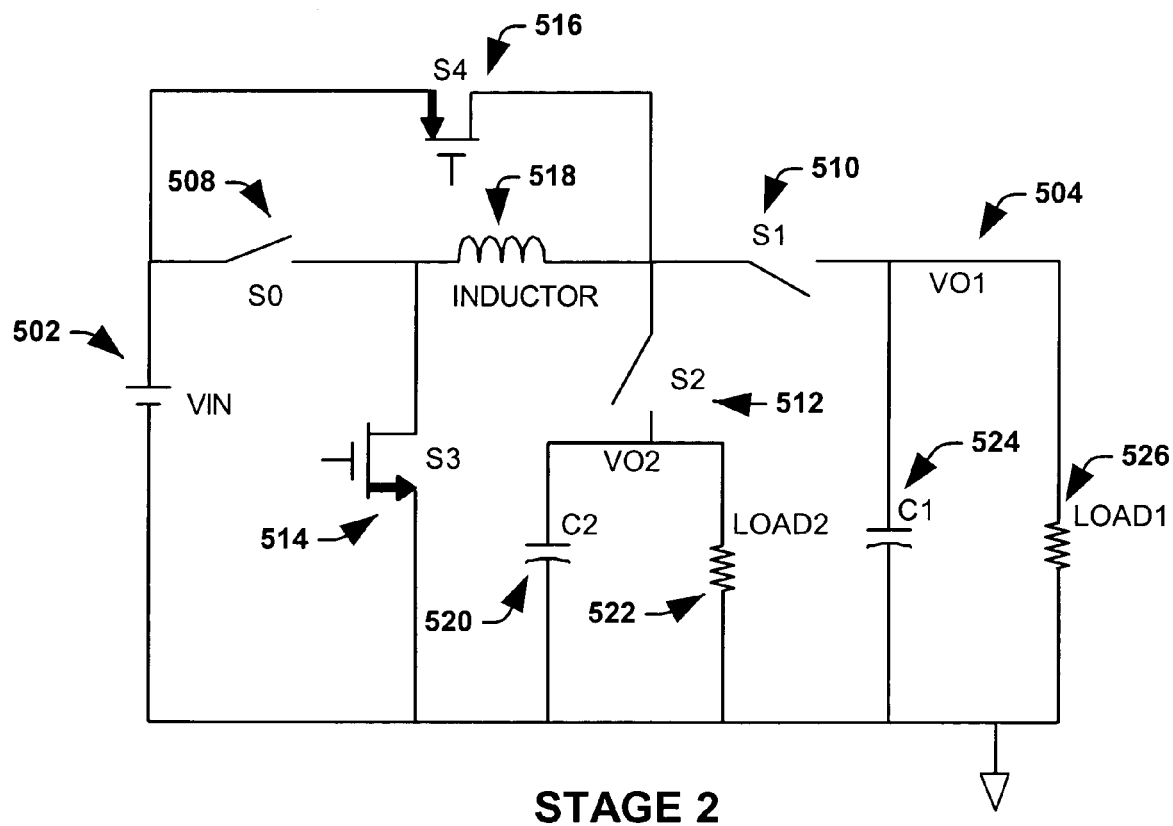
FIG. 8 is a schematic diagram illustrating the buck converter of FIG. 5 in a second stage of operation in accordance with an aspect of the present invention.

Continuing with FIG. 8, another schematic diagram illustrating the buck converter of FIG. 5 in a second stage of operation in accordance with an aspect of the present invention is provided. The second stage is entered from the first stage. In the second stage, the first 508, the second 510, and the third 512 switches are turned OFF and the fourth 514 and the fifth 516 switches are turned ON. The fourth 514 and fifth 516 switches being ON permit inductor current and/or ground current to re-circulate to the power source 502 (e.g., a battery), which can, in some instances, store this power and thus conserve overall power consumption.

Figure 9:
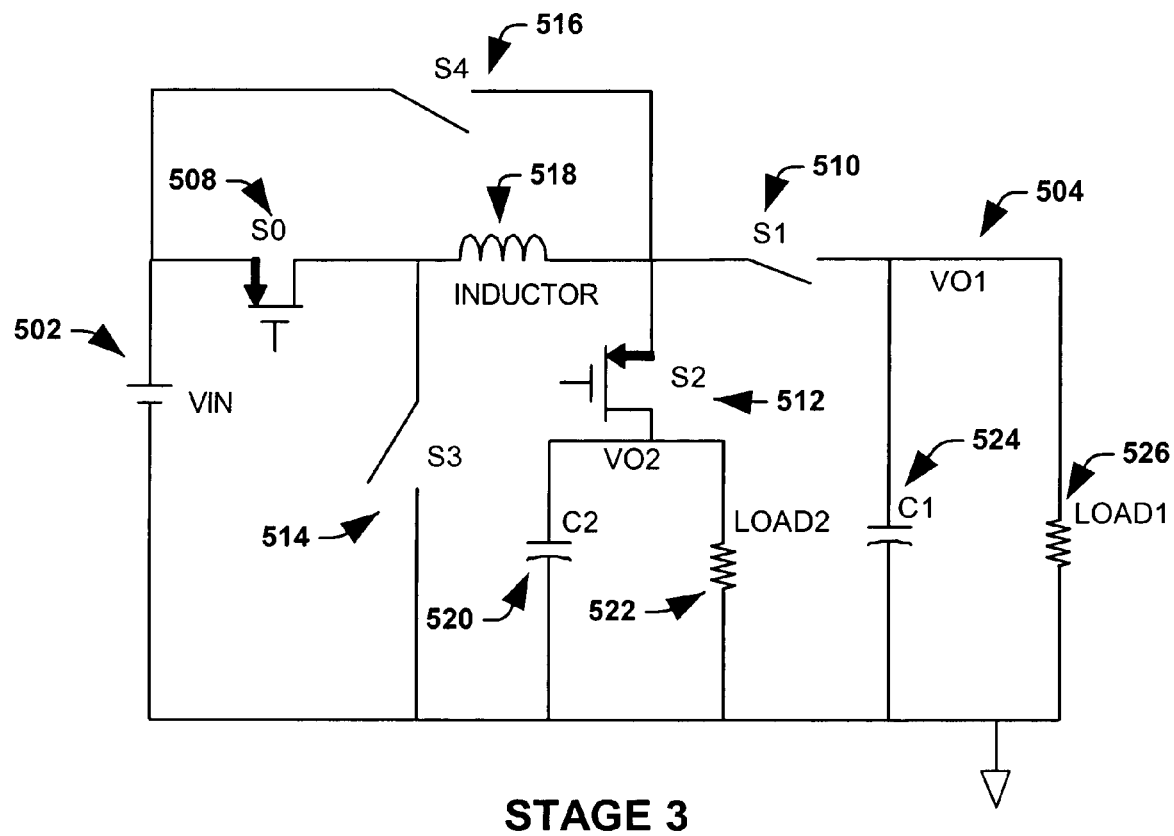
FIG. 9 is a schematic diagram illustrating the buck converter of FIG. 5 in a third stage of operation in accordance with an aspect of the present invention.

FIG. 9 is a schematic diagram illustrating the buck converter of FIG. 5 in a third stage of operation in accordance with an aspect of the present invention. The third stage is entered from the second stage. For the third stage, the first switch 508 and the third switch 512 are turned ON and the second switch 510, the fourth switch 514, and the fifth switch 516 are turned OFF. As a result, the power source 502 provides power/current through the first switch 508, the inductor 518, and the third switch 512 to the second output 506, thereby charging the second capacitor 520 and providing power to the second load 522. The power provided from the power source 502 can be mitigated if excess current remains in the inductor 518 from the previous stages. The converter remains in this stage until output power requirements for the second load 522 are met.

Figure 10:
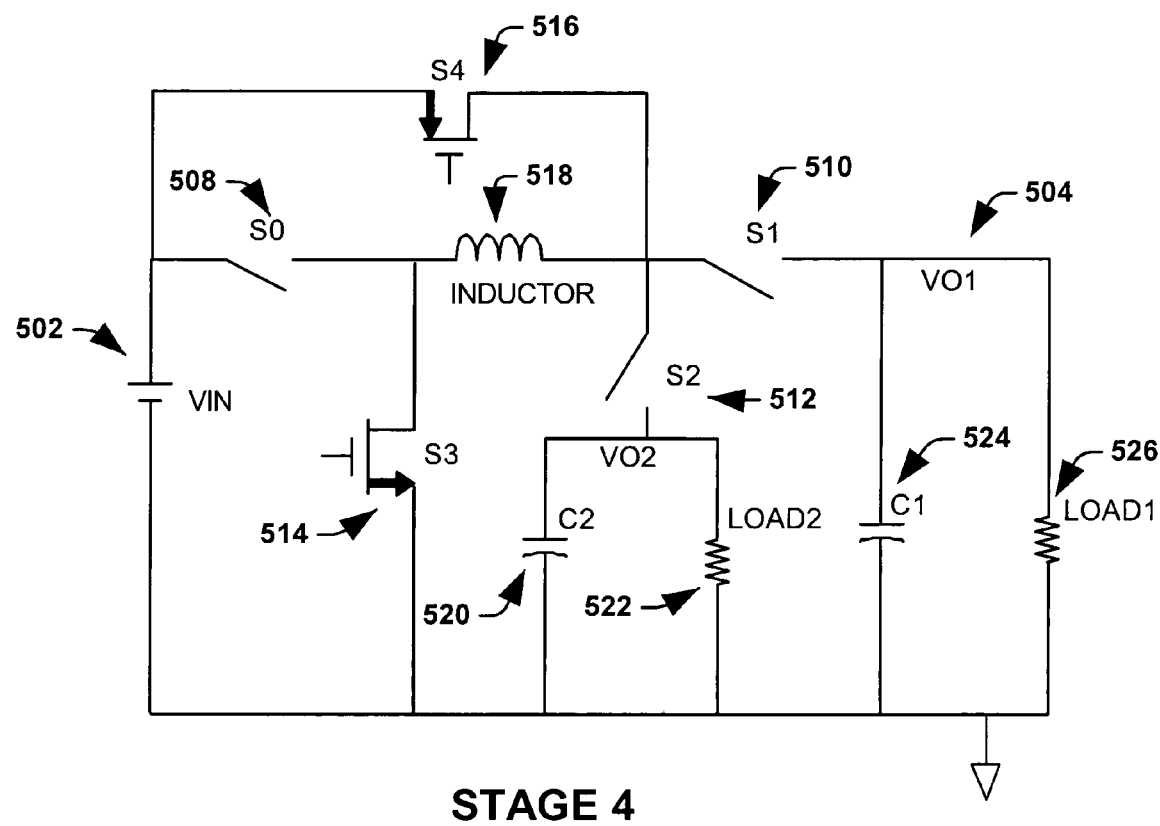
FIG. 10 is a schematic diagram illustrating the buck converter of FIG. 5 in a fourth stage of operation in accordance with an aspect of the present invention.

FIG. 10 is a schematic diagram illustrating the buck converter of FIG. 5 in a fourth stage of operation in accordance with an aspect of the present invention. The fourth stage is entered from the third stage and is substantially similar in operation to the second stage. In the fourth stage of operation, the first 508, the second 510, and the third 512 switches are turned OFF and the fourth 514 and the fifth 516 switches are turned ON. As with the second stage, the fourth 514 and fifth 516 switches being ON permit inductor current and/or ground current to re-circulate to the power source 502 (e.g., a battery), which can, in some instances, store this power and thus conserve overall power consumption. The converter can continue to the first stage if continued operation is desired.

A complete cycle for the converter is a single pass through the four stages of operation described above. The duty cycle for the first output 504 is defined as the ON time of Stage 1, or percentage of the complete cycle spent in the first and second stages of operation. Likewise, the duty cycle for the second output 506 is defined as the ON time of Stage 3, or percentage of the complete cycle spent in the third and fourth stages of operation. The exemplary ramp signals illustrated in FIG. 6 depict duty cycles of about 50% for both the first output 504 and the second output 506. However, the duty cycles can vary to provide power requirements. For example, if the second output has relatively low or no power requirements, its duty cycle can be relatively small or zero and the first output's duty cycle can be relatively large (e.g., greater than 50%). Furthermore, the second and fourth stages of operation permit inductor current to re-circulate during non-duty cycle periods. A controller (not shown) can control the switches and thereby, the duty cycles to provide or meet the power requirements. Additionally, the controller can dynamically modify the duty cycles to meet changing power requirements. For example, the controller can cause the converter to only provide power to the first output for a period of time and then later provide controlled power to both outputs.

The control described above permits each duty cycle to be calculated and permits a proportionally larger amount of the complete cycle to be allocated to the output requiring the larger duty cycle, depending on output requirements (e.g., output voltages requirements, output current requirements, and the like).

The converter of FIG. 5 operated as described above, has a relatively low delta I peak current when the outputs have comparable loads (e.g., 30 mA with a voltage ripple of less than about 5 mV). Low cross talk is maintained and relatively large output load currents (e.g., 800 mA) can be sourced by the converter. Average inductor current can be relatively increased due to the re-circulation.

The following discussion provides a derivation of the duty cycle equations for the converter of FIG. 5. Vin is the power source 502, $V_{o1}$ is the voltage on the first output 504, and $V_{o2}$ is the voltage on the second output 506 of FIG. 5. $V_f$ is the diode forward voltage, which is the voltage across the fifth switch 516. "T" is the converter operating period or complete cycle and $t_1$, $t_2$, $t_3$, and $t_4$, are the times the converter operates in the first, second, third, and fourth stages, respectively, as described supra.

$$(Vin - V_{O1})t_1 = (Vin + 2V_f)t_2 + (V_{O2} - Vin)t_3 + (Vin + 2V_f)t_4 \qquad \text{Eq. 1}$$

$$t_1 + t_2 + t_3 + t_4 = T \qquad \text{Eq. 2}$$

Eq. 1 and Eq. 2 can be rearranged into Eq. 3:

$$\frac{(Vin - V_{O1})t_1 + (Vin - V_{O2})t_3}{(Vin + 2V_f)} = t_2 + t_4 \qquad \text{Eq. 3}$$

$$T - t_1 - t_3 = t_2 + t_4 \qquad \text{Eq. 4}$$

By equating and re-arranging, the following equation is obtained:

$$\frac{(Vin - V_{O1})t_1 + (Vin - V_{O2})t_3}{(Vin + 2V_f)} + t_1 + t_3 = T \qquad \text{Eq. 5}$$

$$t_1 * I_L = I_{O1} * T; \; t_3 * I_L = I_{O2} * T \qquad \text{Eq. 6}$$

$$\Rightarrow \frac{t_1 * I_L}{t_3 * I_L} = \frac{I_{O1} * T}{I_{O2} * T} \qquad \text{Eq. 7}$$

$$\Rightarrow \frac{t_1}{t_3} = \frac{I_{O1}}{I_{O2}} \qquad \text{Eq. 8}$$

$I_L$ is inductor current, $I_{O1}$ is current sourced to the first output, and $I_{o2}$ is current sourced to the second output. The duty cycles for the first output (DC1) and the second output (DC2) are defined as:

$$DC1 = t1/T \text{ and } DC2 = t3/T \qquad \text{Eq. 9}$$

To solve for DC1, Eq. 8 is solved for t3, and then replaced in Eq. 5. After which, the following equation is obtained:

$$DC1 = \frac{t_1}{T} \qquad \text{Eq. 10}$$

$$= \frac{Vin}{(2Vin - V_{O1} - 2V_f) + (2Vin + V_{O2} - 2V_1)\frac{I_{O1}}{I_{O2}}}$$

DC2 can be solved also by replacing $t_1$ in Eq 5, with that variable in Eq. 9. The diode forward voltage can be assumed to be zero ($V_f = 0$), resulting in the following suite of equations to describe the converter.

$$DC1 = \frac{t_1}{T} = \frac{Vin}{(2Vin - V_{O1}) + (2Vin - V_{O2})\frac{I_{O2}}{I_{O1}}}; \qquad \text{Eq. 11}$$

$$DC2 = \frac{t_3}{T} = \frac{Vin\frac{I_{O2}}{I_{O1}}}{(2Vin - V_{O1}) + (2Vin - V_{O2})\frac{I_{O2}}{I_{O1}}}$$

-continued $$DC = \frac{t_1 + t_3}{T} = \frac{Vin\left(1 + \frac{I_{o2}}{I_{o1}}\right)}{(2Vin - V_{O1}) + (2Vin - V_{O2})\frac{I_{o2}}{I_{o1}}} \qquad \text{Eq. 12}$$

The above derived duty cycle equations have some interesting properties. First they are only symmetrical when both output currents are equal ($I_{o1}=I_{o2}$). In this scenario, the duty cycle for both outputs is also equal and is about 30% for $V_{in}=5.4V$, $V_{o1}=1.2V$, and $V_{o2}=1.8V$ and 34% for $V_{in}=2.7V$, with both duty cycles being less than 50%. As a result, both converters have un-truncated duty cycles. Additionally, because of the non-symmetry that results in having different output currents, it is possible to find a range with which both converters will have <50% duty cycle. Such a range can indicate when cross talk is at or about a minimum value (ideally zero). That range of reduced cross talk is given by the ratio equation: $0.375 < I_{O1}/I_{O2} < 3.5$ or $0.286 < I_{O2}/I_{O1} < 2.6667$. When the current ratio falls outside of these boundaries, the equations show that one converter output has a duty cycle greater than 50% and the other has a duty cycle of much less than 50%. Hence with the time-varying control algorithm, the output load current requirements for both converters are satisfied, and complete un-truncated duty cycles are maintained.

Figure 11:
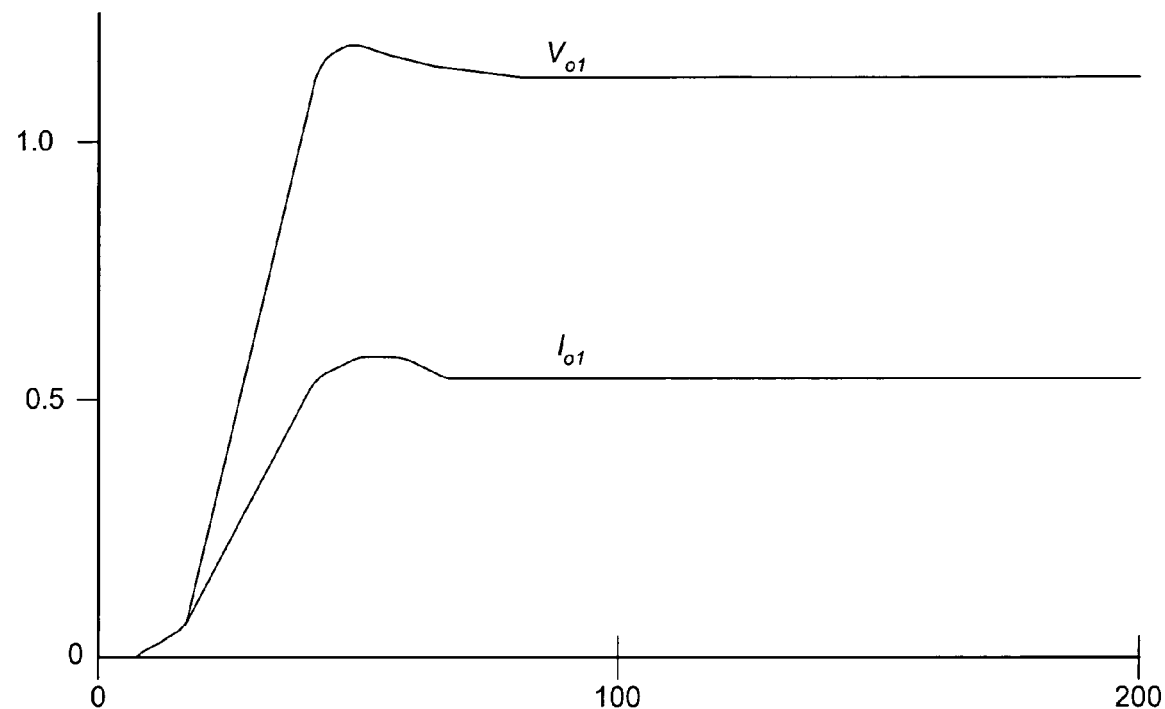
FIG. 11 is a graph illustrating a first output of the buck converter in accordance with an aspect of the present invention.
Figure 12:
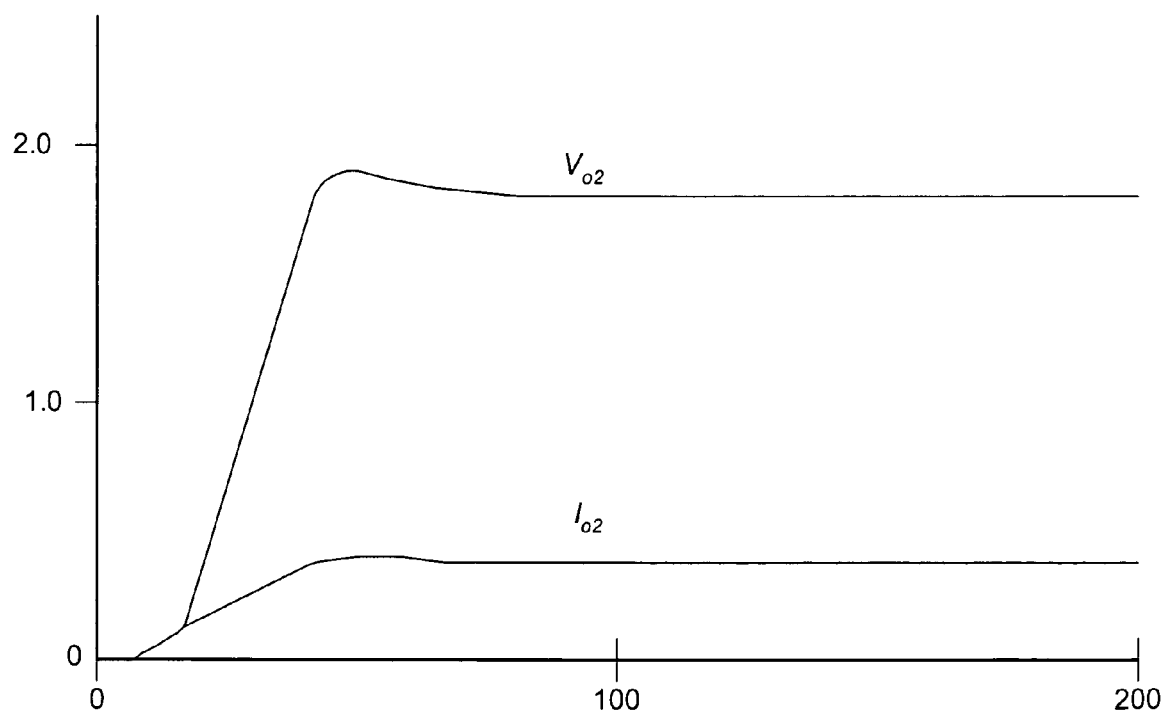
FIG. 12 is a graph illustrating a second output of the buck converter in accordance with an aspect of the present invention.

FIGS. 11–16, described below, relate to a first exemplary simulation of operation and use of a single inductor dual output buck converter in accordance with an aspect of the present invention. In this simulation, the buck converter is providing a first output at 1.2 V and 600 mA and a second output at 1.8 V and 200 mA. A suitable exemplary value for output capacitors (e.g., 816 and 820 of FIG. 8) is 22 micro Farads and a suitable value for an inductor (e.g., 812 of FIG. 8) is 10 micro Henries. If the load (e.g., 818 and 822) is modeled as a resistor then it is commensurate with the load current and voltage (e.g., 1.2V/100 mA=12 Ohms resistance). FIGS. 11 and 12, described below, illustrate exemplary output voltages and currents for the single inductor dual output buck converter of this simulation.

FIG. 11 is a graph illustrating a first output of the buck converter in accordance with an aspect of the present invention. The x-axis represents time in micro seconds and the y-axis represents voltage and current. As can be seen, the first output voltage $V_{o1}$ is about 1.2 V and the first output current $I_{o1}$ is about 600 mA. FIG. 12 is a graph illustrating a second output of the buck converter in accordance with an aspect of the present invention. The x-axis represents time in micro seconds and the y-axis represents voltage and current. As can be seen, the second output voltage $V_{o2}$ is about 1.8 V and the second output current $I_{o2}$ is about 200 mA.

Figure 13:
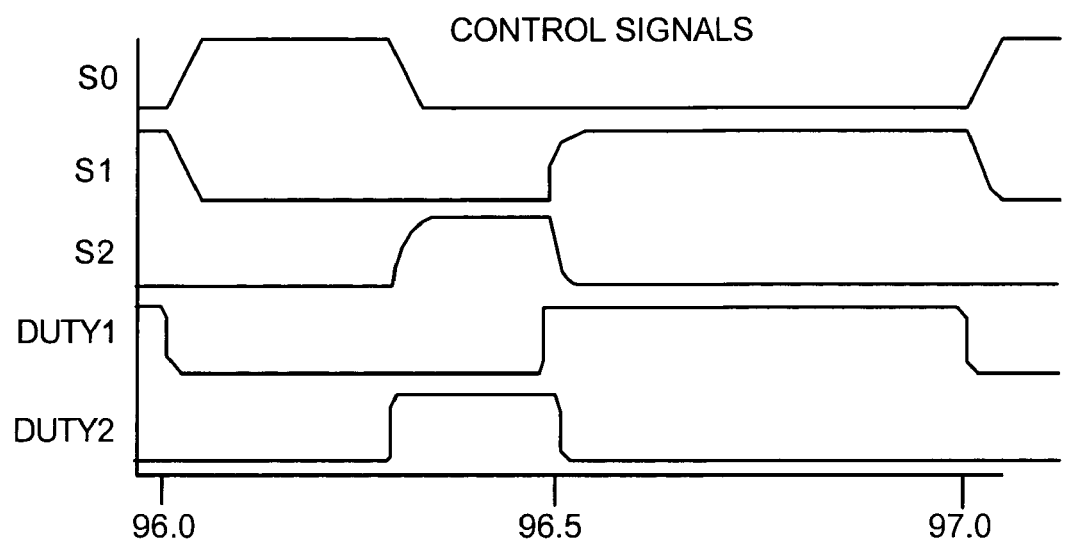
FIG. 13 is a graph illustrating exemplary control signals and duty cycles in accordance with an aspect of the present invention.

FIG. 13 is a graph illustrating exemplary control signals and duty cycles in accordance with an aspect of the present invention. An x-axis depicts time in micro seconds, wherein a complete cycle or time period is about 1 micro second. A y-axis depicts control signals for a first switch (S0), a second switch (S1), and a third switch (S2), which are further described with respect to FIG. 5. Generally, high indicates the respective switch is ON and low indicates that the respective switch is OFF. A duty cycle for the second output (DUTY2) indicates that it is ON about 35% whereas a duty output for the first output (DUTY1) indicates that is about equal to 50%, in this example.

Figure 14:
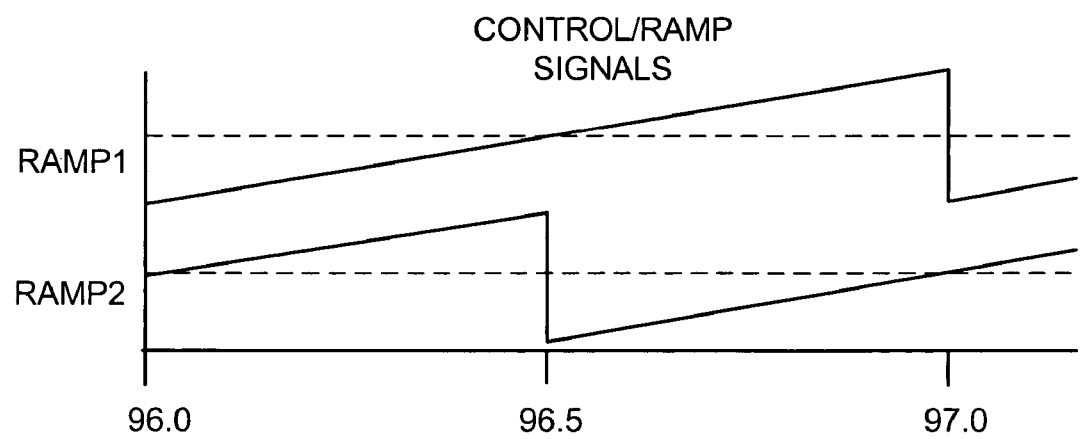
FIG. 14 is a graph illustrating two exemplary ramp signals that can be employed in accordance with an aspect of the present invention.

FIG. 14 is a graph illustrating two exemplary ramp signals that can be employed in accordance with an aspect of the present invention. A first ramp (RAMP1) signal controls operation in the third and fourth stages wherein power is supplied to the second output when positive and DUTY2 in FIG. 13 is ON, and a second ramp signal (RAMP2) controls operation in the first and second stages wherein power is supplied to the first output when positive and when DUTY1 in FIG. 13 is ON. As described supra, two comparators receive the ramp signals, which drives logic that controls operation of the converter in the respective stages. The logic controls the amount of time spent in the re-circulation stages (stage 2 and 4).

Figure 15:
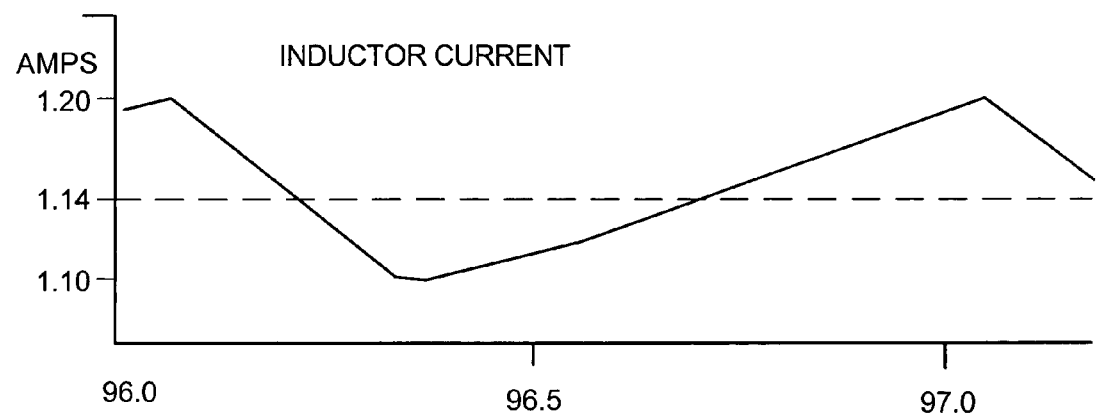
FIG. 15 is a graph illustrating exemplary inductor current obtained during operation of the converter in accordance with an aspect of the present invention.

FIG. 15 is a graph illustrating exemplary inductor current obtained during operation of the converter in accordance with an aspect of the present invention. The inductor current is depicted for a complete cycle of operation. In the first half, stages 1 and 2 are performed. The trough of the current depicts the beginning of stage 1. As a result, inductor current is seen initially increasing. At 96.5 microseconds stage 1 ends and stage 2 begins. However in this example, stage2 is ON for approximately ZERO microseconds. Hence stage 3 begins at 96.5 microseconds; wherein the inductor current initially continues to increase throughout the second half, where stages 3 and 4 are performed. At 97 microseconds stage 3 ends and stage 4 begins. The inductor current slowly decreases as it re-circulates to the battery. This will occur until the inductor current reaches the same magnitude as the trough value that stage 1 began at. This occurs around 93.7 microseconds at which point stage 4 ends and stage 1 begins again.

Figure 16:
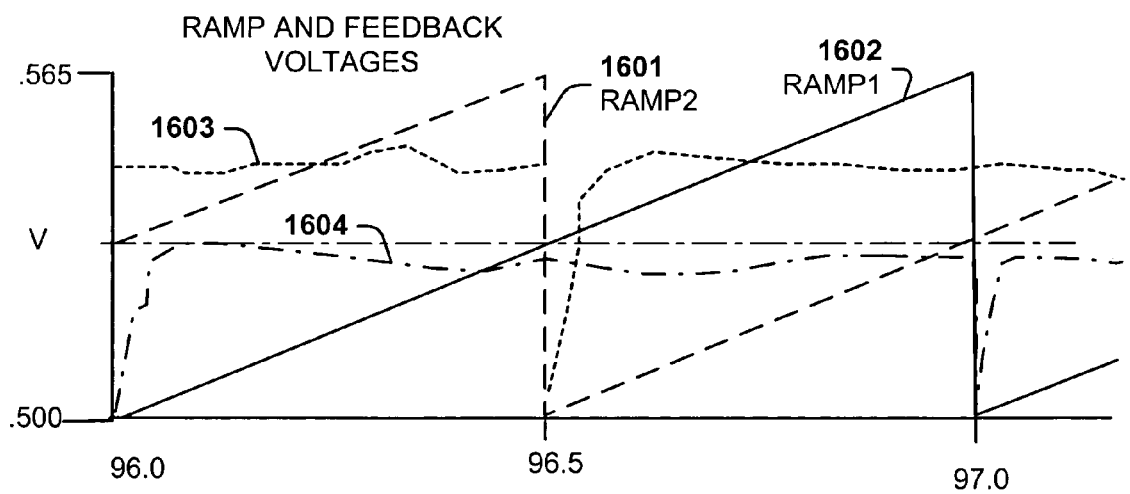
FIG. 16 is a graph illustrating superimposed ramp signals and feedback voltages of the converter in accordance with an aspect of the present invention.

Turning now to FIG. 16, a graph that illustrates superimposed ramp signals and feedback voltages of the converter in accordance with an aspect of the present invention is shown. The graph shows a RAMP1 signal 1602, a RAMP2 signal 1601, a first feedback voltage 1603, and a second feedback voltage 1604. As described with respect to FIG. 14, the RAMP1 signal 1602 and the RAMP2 signal 1601 are control signals along with their respective feedback voltages, which though respective comparators, logic, and a driver operate the converter. Power is supplied to the second output when the RAMP1 signal 1602 is positive AND above the feedback voltage 1604. Power is supplied to the first output when RAMP2 signal 1601 is positive AND above the feedback voltage 1603. The first feedback voltage is described by the following equation: VFB1=VREF+(1−DUTY1)*VRAMP where VREF is the system reference voltage (about 500 mV), VRAMP is the RAMP voltage magnitude (65 mV in this example) and DUTY1 is the ON time of the first output. The second feedback voltage is described by the following equation: VFB2=VREF+(1−DUTY2)*VRAMP where VREF is the aforementioned system reference voltage (about 500 mV), VRAMP is the aforementioned RAMP voltage magnitude (65 mV in this example), and DUTY2 is the ON time of the second output.

FIGS. 17–23, described below, relate to a second simulation of operation and use of a single inductor dual output buck converter in accordance with an aspect of the present invention. For this simulation, the buck converter is providing a first output at 1.2 V and 600 mA and a second output at 1.8 V and 1.8 mA.

Figure 17:
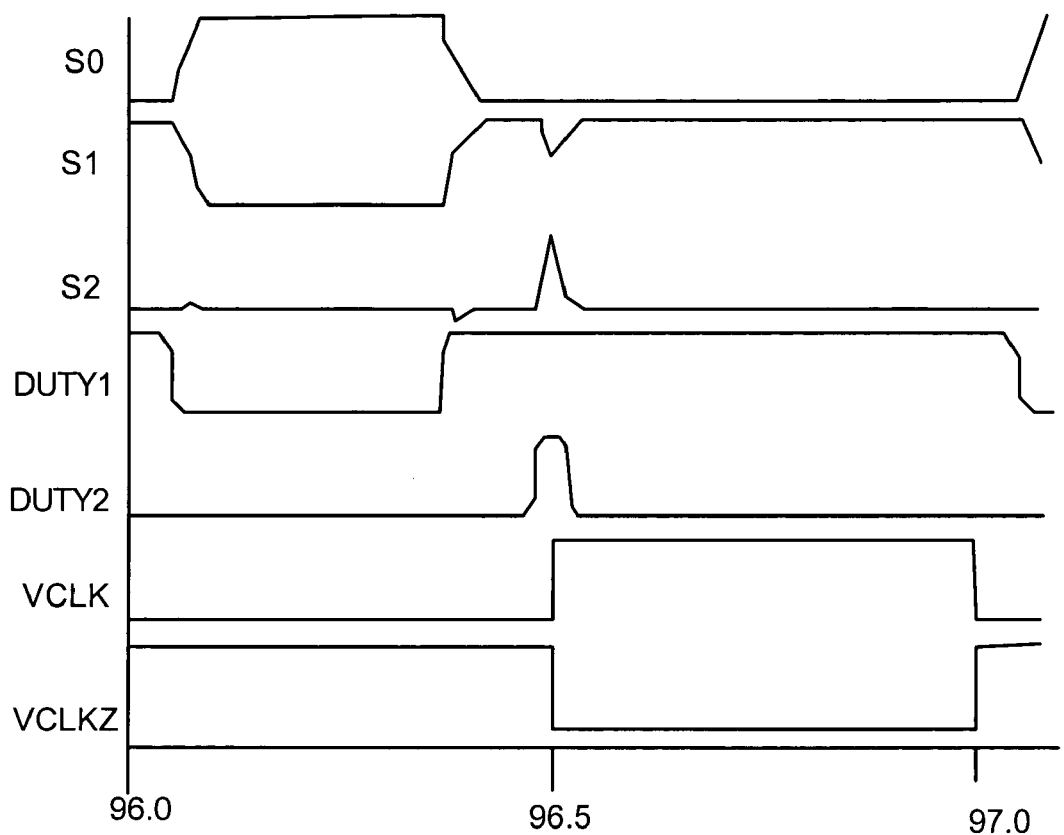
FIG. 17 is a graph illustrating exemplary control signals and duty cycles for the buck converter of the second simulation in accordance with an aspect of the present invention.

FIG. 17 is a graph illustrating exemplary control signals and duty cycles for the buck converter of the second simulation in accordance with an aspect of the present invention. An x-axis depicts time in micro seconds, wherein a complete cycle or time period is about 1 micro second. A y-axis depicts control signals for a first switch (S0), a second switch (S1), and a third switch (S2), which are further described with respect to FIG. 5. Generally, high indicates the respective switch is ON and low indicates that the respective switch is OFF. A duty cycle for the second output (DUTY2) indicates that it is ON about 75% whereas a duty output for the first output (DUTY1) indicates that is much less than 50%, in this example. A system clock (VCLK) and its complement (VCLKZ) are also shown in the graph.

Figure 18:
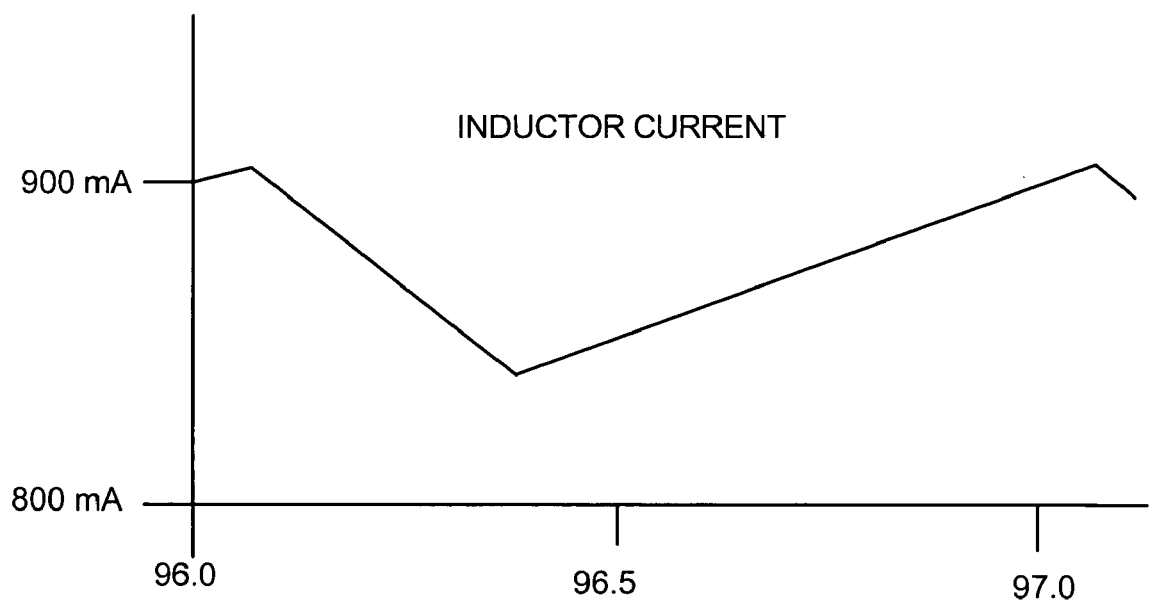
FIG. 18 is a graph illustrating exemplary inductor current obtained during operation of the converter in accordance with an aspect of the present invention.

FIG. 18 is a graph illustrating exemplary inductor current obtained during operation of the converter in accordance with an aspect of the present invention. Here, the inductor current can be seen increasing when supplying current to the first output and second outputs respectively and relatively decreasing when in re-circulation. It is noted that even when power is not being delivered to the first and/or second outputs, inductor current, referred to as re-circulation current, is present. The re-circulation current can charge a battery based power source.

Figure 19:
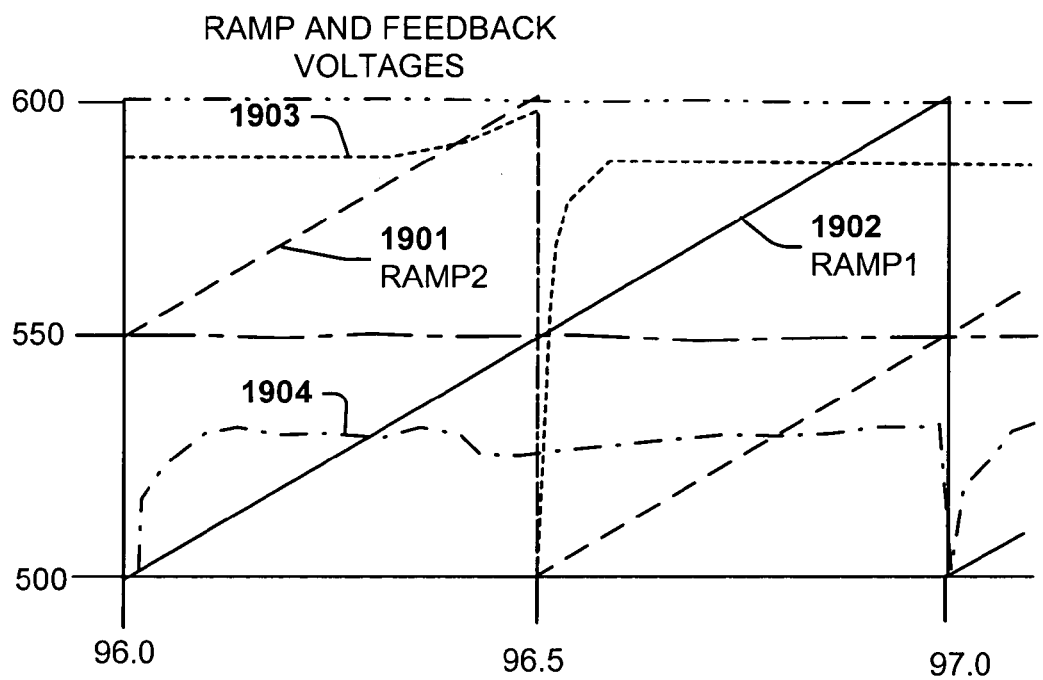
FIG. 19 is a graph illustrating superimposed ramp signals and feedback voltages of the converter in accordance with an aspect of the present invention.

Turning now to FIG. 19, a graph that illustrates superimposed ramp signals and feedback voltages of the converter in accordance with an aspect of the present invention is shown. The graph shows a RAMP1 signal 1902, a RAMP2 signal 1901, a first feedback voltage 1903, and a second feedback voltage 1904. The RAMP1 signal 1902 and the RAMP2 signal 1901 are control signals along with their respective feedback voltages, which through respective comparators, logic, and a driver to operate the converter. Power is supplied to second output when the RAMP1 signal 1902 is positive AND above the feedback voltage 1904. Power is supplied to the first output when the RAMP2 signal 1901 is positive AND above the feedback voltage 1903. The first feedback voltage is described by the following equation: $VFB1=VREF+(1-DUTY1)*VRAMP$ where VREF is the system reference voltage (about 500 mV), VRAMP is the RAMP voltage magnitude (65 mV in this example) and DUTY1 is the ON time of the first output. The second feedback voltage is described by the following equation: $VFB2=VREF+(1-DUTY2)*VRAMP$ where VREF is the aforementioned system reference voltage (about 500 mV), VRAMP is the aforementioned RAMP voltage magnitude (65 mV in this example), and DUTY2 is the ON time of the second output.

Figure 20:
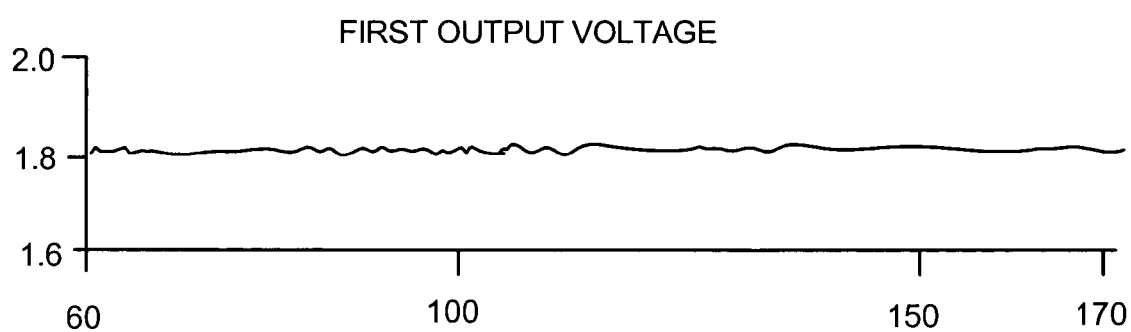
FIG. 20 is a graph illustrating simulated voltage output for a first output of the single inductor dual output buck converter in accordance with an aspect of the present invention.
Figure 21:
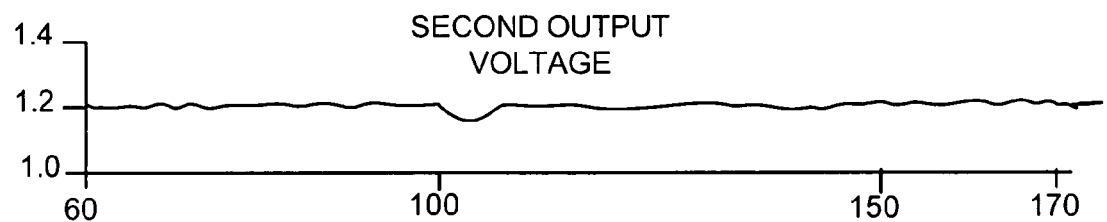
FIG. 21 is a graph illustrating simulated output for a second output of the single inductor dual output buck converter in accordance with an aspect of the present invention.
Figure 22:
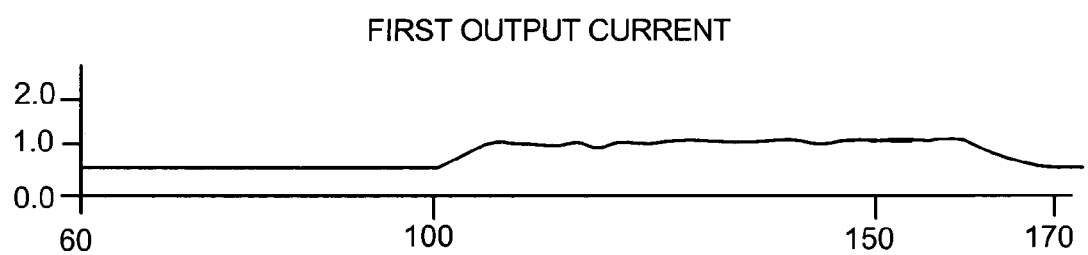
FIG. 22 is a graph illustrating simulated current output for the first output of the single inductor dual output buck converter in accordance with an aspect of the present invention.
Figure 23:
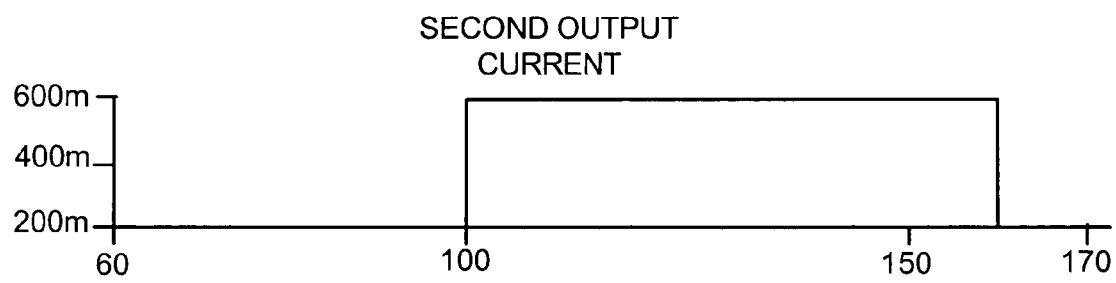
FIG. 23 is another graph illustrating simulated current output for the second output of the single inductor dual output buck converter in accordance with an aspect of the present invention.

FIGS. 20–23, presented below, depict simulated outputs for the buck converter of the second simulation over time and serve to illustrate the absence of substantial cross talk in the converter's outputs. FIG. 20 is a graph illustrating simulated voltage output for a first output of the single inductor dual output buck converter in accordance with an aspect of the present invention. The first output is provided with a relatively stable voltage of about 1.8 Volts. FIG. 21 is a graph illustrating simulated output for a second output of the single inductor dual output buck converter in accordance with an aspect of the present invention. The second output is shown being provided with a relatively stable voltage of about 1.2 Volts. FIG. 22 is a graph illustrating the simulated overall current in the inductor of the single inductor dual output buck converter in accordance with an aspect of the present invention. The inductor current is an exemplary 600 mA, of which 33.33% or ⅓ DUTY1 ON time (600 mA*⅓=200 mA) power goes to first output of 1.8V. FIG. 23 is another graph illustrating simulated current output for the second output (1.2V) of the single inductor dual output buck converter in accordance with an aspect of the present invention. Unlike the first output, the second output requires a pulse of current from zero to about 600 mA. Yet, the pulse of current does not indicate a substantial presence of crosstalk at the first output (1.8V), as can been seen in FIG. 20 at time 100 microseconds. This spike of current will cause a temporary transient undershoot on the second output (1.2V) as can be seen in FIG. 21 at time 100 microseconds, which subsequently recovers back to 1.2V. Finally the overall inductor current increases to 1.15A as can be seen in FIG. 22 at time 100 microseconds.

In view of the foregoing structural and functional features described supra in FIGS. 1–23, methodologies in accordance with various aspects of the present invention will be better appreciated with reference to the above figures. While, for purposes of simplicity of explanation, the methodologies described below are depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

Figure 24:
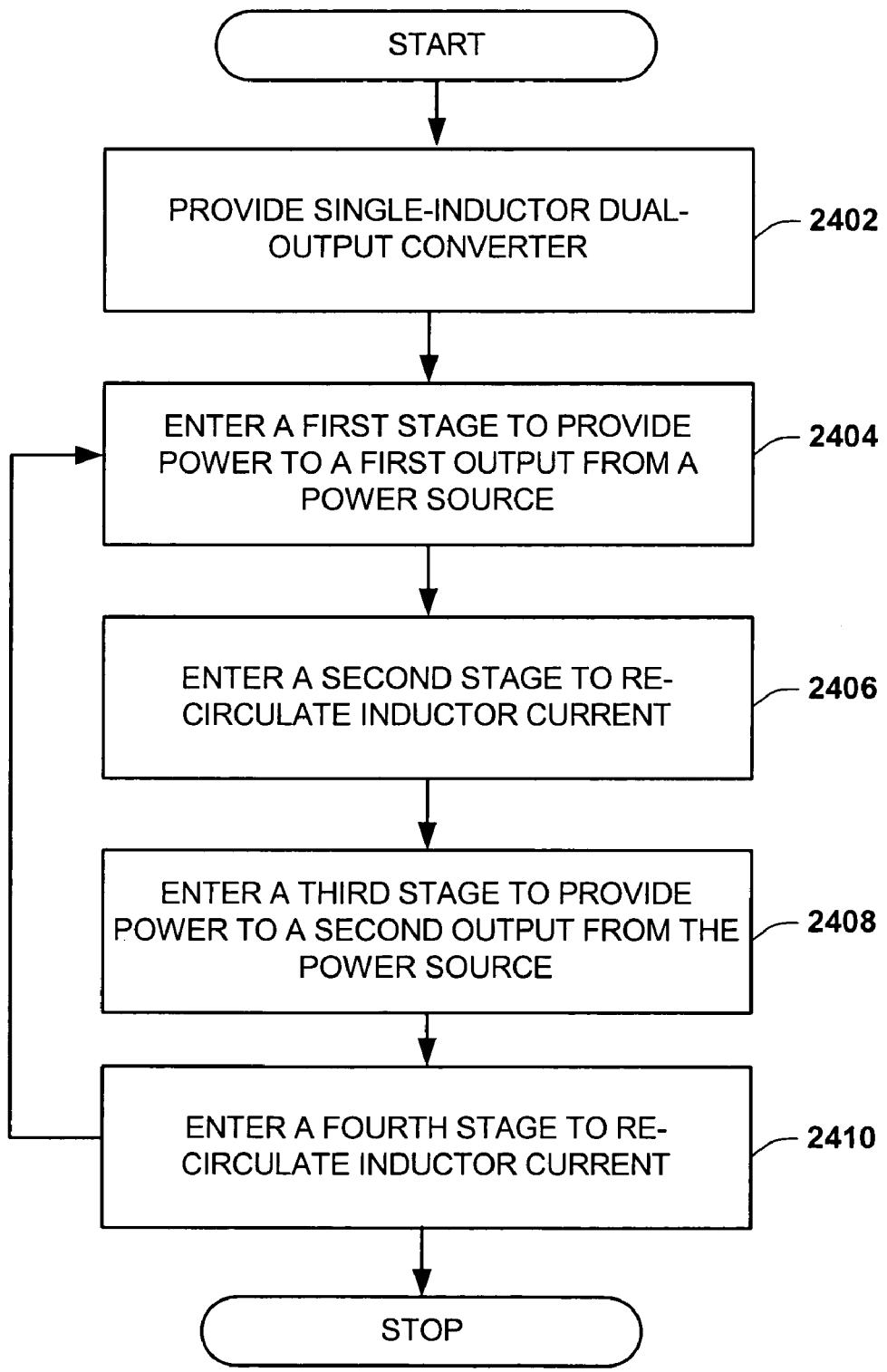
FIG. 24 is a flow diagram illustrating a method of operating a single-inductor dual-output buck converter in accordance with an aspect of the present invention.

FIG. 24 is a flow diagram illustrating a method of operating a single-inductor dual-output buck converter in accordance with an aspect of the present invention. The method is able to provide dual output voltages by operating a suitable single-inductor dual-output topology (e.g., see FIG. 5) and controlling operation of the switches therein. Additionally, the present invention includes performing the below stages at a selected frequency to obtain desired output voltages.

The method begins at block 2402 wherein a single-inductor dual-output buck converter of the present invention is provided. The converter comprises five switches, two capacitors, two outputs, one power supply/source, and a single inductor (e.g., FIG. 5). The method enters a first stage of operation at block 2404 that supplies power to a first output. In this stage, a first switch is turned ON to connect the power source to the inductor and a second switch is turned ON to connect the inductor to the first output. A third switch, which connects the inductor to a second output, is turned OFF. Fourth and fifth switches, which essentially operate as re-circulation diodes, are OFF in this stage. The first, second, and third switches can be referred to as operational switches whereas the fourth and fifth switches can be referred to as re-circulation switches. A capacitor at the first output stores some of the supplied power for later operation.

The first stage is exited after a selected period of time and the method enters a second stage of operation at block 2406, also referred to as a re-circulation stage. In this stage, the inductor current re-circulates from the inductor to the power source so as to reduce power consumption by the converter. The re-circulated current can partially charge the power source. In the second stage, the operational switches are turned OFF and the re-circulation switches are turned ON thereby permitting inductor current to re-circulate to the power source.

After another period of time, the converter enters a third stage of operation at block 2408 wherein power is supplied by the power source to a second output. In this stage, the first switch is turned ON to connect the power source to the inductor and the third switch is turned ON to connect the inductor to the second output. The second switch, which connects the inductor to the first output, is turned OFF. The re-circulation switches (the fourth and fifth) are OFF in this stage.

The third stage is exited after a selected period of time and the method enters a fourth stage of operation at block 2410, also referred to as a re-circulation stage. This stage is similar to the second stage, also referred to as a re-circulation stage.

Here, the inductor current re-circulates from the inductor to the power source so as to reduce power consumption by the converter. The re-circulated current can partially charge the power source. As with the second stage, the operational switches are turned OFF and the re-circulation switches are turned ON thereby permitting inductor current to re-circulate to the power source.

The voltage and current provided to the first and second outputs can be regulated and controlled by controlling the amount of time spent in the four stages of operation. The total time spent in the four stages is referred to as a cycle or complete cycle. The time spent in the first stage of operation as a percentage of the complete cycle is referred to as a first duty cycle and is the stage wherein power is supplied to the first output. The time spent in the third stage of operation as a percentage of the complete cycle is referred to as a second duty cycle, and is the stage where power is supplied to the second output. The choice of complete cycle times and the first and second duty cycles can be varied and modified, dynamically, during operation to attain desired voltages, currents, and power savings. Further, as seen with the above simulations, the first and second duty cycles can vary widely to permit relatively large amounts of power to be supplied to one output and a relatively small amount of power to the other.

Figure 25:
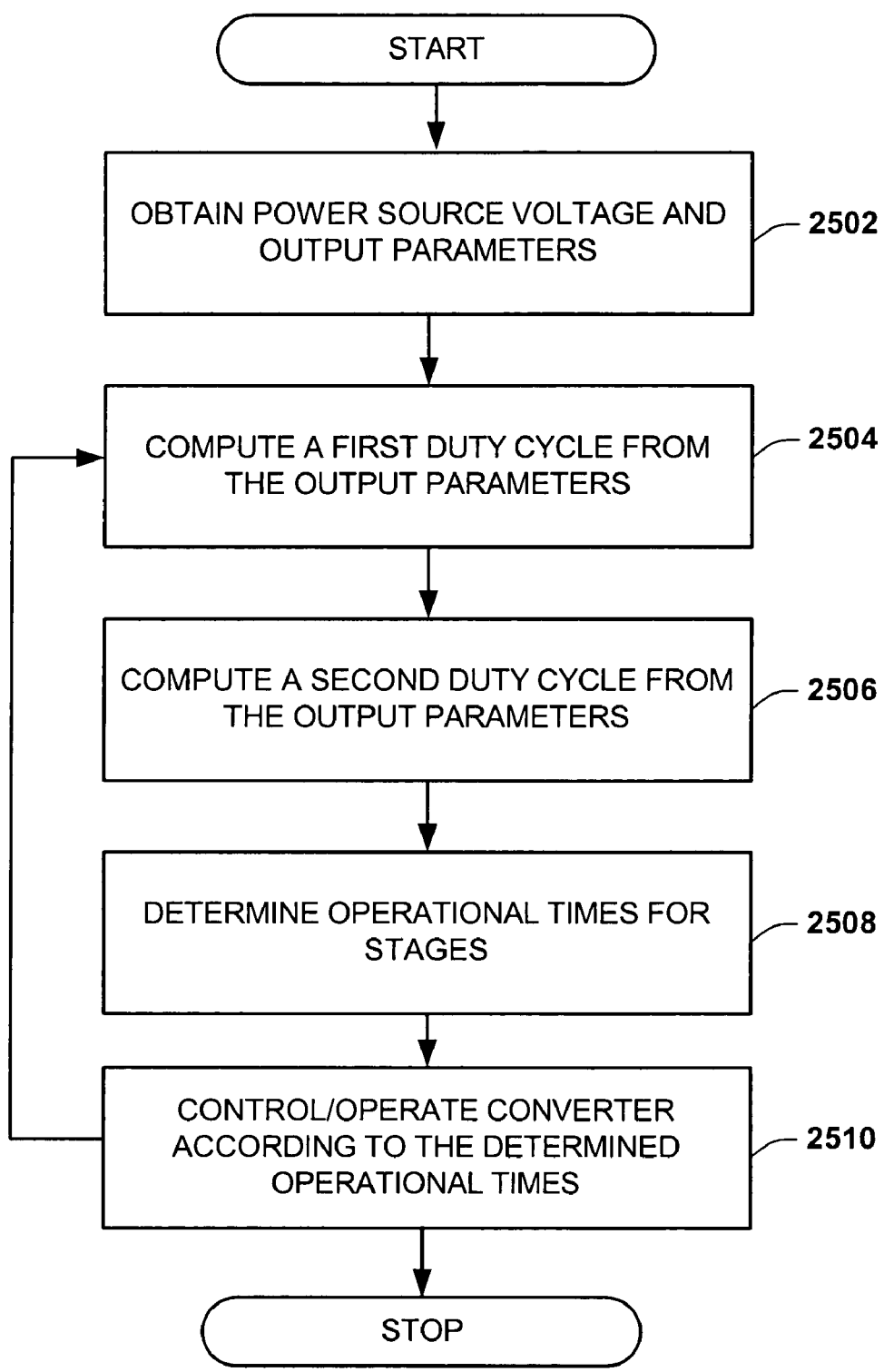
FIG. 25 is a flow diagram illustrating a method of operating a single-inductor dual-output buck converter in accordance with an aspect of the present invention.

FIG. 25 is a flow diagram illustrating a method of operating a single-inductor dual-output buck converter in accordance with an aspect of the present invention. The method dynamically selects and sets duty cycles for a first and second output to obtain the converter to supply desired voltages and currents to the outputs. The method is able to provide dual output voltages by operating a suitable single-inductor dual-output topology (e.g., see FIG. 5) and controlling operation of the switches therein.

The method begins at block 2502, wherein a power source voltage and output parameters are obtained. The output parameters include a first output voltage, a first output current, a second output voltage, and a second output current. From the output parameters, a first duty cycle is computed at block 2504. The first duty cycle is a percentage of the complete cycle in which power is supplied to a first output. The first duty cycle is computed by utilizing Eq. 11, described above to solve for DC1. Continuing, a second duty cycle is computed at block 2506 from the output parameters. The second duty cycle is a percentage of the complete cycle wherein power is supplied to a second output.

Operational times are computed for first, second, third, and fourth stages of operation at block 2508 according to the first and second duty cycles. The equations provided supra (Eqs. 1–12) can be employed to determine the operational times. Finally, at block 2510, the converter is controlled according to the operational times computed at block 5208 to provide the desired output voltages and currents. If output requirements are modified during operation, the method can return to block 2504 to modify operation of the converter. Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A single-inductor dual-output buck converter comprising:
    a power source that supplies DC power for conversion by the converter by reducing the voltaae thereof;
    a first output that selectively obtains power from the power source through an inductor and provides a first output voltage and a first output current according to a first duty cycle;
    a second output that selectively obtains power from the power source through the inductor and provides a second output voltage and a second output current according to a second duty cycle; and
    a re-circulation switch that re-circulates inductor current to the power source during non-duty cycle periods.

2. The converter of claim 1, further comprising a second first switch that controllably connects the power source to the inductor.

3. The converter of claim 2, further comprising a thrid seoond switch that controllably connects the first output to the inductor.

4. The converter of claim 3, further comprising a fourth third switch that controllably connects the second output to the inductor.

5. The converter of claim 1, wherein the power source is a battery.

6. The converter of claim 1, wherein the first output comprises a first capacitor and a first load.

7. The converter of claim 6, wherein the second output comprises a second capacitor and a second load.

8. The converter of claim 1, further comprising a controller that operates the converter in a first stage that provides power to the first output, a second stage that re-circulates current to the power source, a third stage that provides power to the second output, and a fourth stage that re-circulates current to the power source.

9. The converter of claim 1, wherein the controller further operates at a fixed frequency and controls the first duty cycle by a period of time spent in the first stage and controls the second duty cycle by a period of time spend in the third stage.

10. The converter of claim 1, wherein the power supply produces a voltage of about 5.4 V, the first output produces a voltage of about 1.8 V and a current of about 200 mA, and the second output produces a voltage of about 1.2 V and a current of about 600 mA.

11. A single-inductor dual-output buck converter comprising:
    a power source having a positive terminal and a negative terminal, wherein the negative terminal is connected to ground;
    a first switch having a first terminal and a second terminal, wherein the first terminal is connected to the positive terminal of the power source;

an inductor having a first terminal and a second terminal, wherein the first terminal is connected to the second terminal of the first switch;

a second switch having a first terminal and a second terminal, wherein the first terminal is connected to the second terminal of the inductor;

a third switch having a first terminal and a second terminal, wherein the first terminal is connected to the second terminal of the inductor;

a first output connected to ground and the second terminal of the second switch; and a second output connected to ground and the second terminal of the third switch.

12. The converter of claim 11, wherein the first output comprises a first load and a first capacitor, the first load having a positive terminal connected to the second terminal of the second switch and a negative terminal connected to ground, the first capacitor having a positive terminal connected to the second terminal of the second switch and a negative terminal connected to ground.

13. The converter of claim 11, wherein the second output comprises a second load and a second capacitor, the second load having a positive terminal connected to the second terminal of the third switch and a negative terminal connected to ground, the second capacitor having a positive terminal connected to the second terminal of the third switch and a negative terminal connected to ground.

14. The converter of claim 11, wherein the first switch is turned ON during a first and a third stage of operation, the second switch is turned ON during the first stage of operation, and the third switch is turned on during the third stage of operation.

15. The converter of claim 11, further comprising a fourth switch and a fifth switch that operate to re-circulate current to the power source during a second and fourth stage of operation.

16. A method of operating a single-inductor dual-output buck converter comprising:

entering a first stage of operation that provides power from a battery through an inductor to a first output for a first period of time;

entering a second stage of operation that re-circulates inductor current to at least partially recharge the battery for a second period of time;

entering a third stage of operation that provides power from the battery through the inductor to a second output for a third period of time; and entering a fourth stage of operation that re-circulates inductor current to at least partially recharge the battery for a fourth period of time.

17. The method of claim 16, wherein the method is performed in order and operates at a fixed frequency.

18. The method of claim 16, wherein the first period of time is selected according to a first duty cycle and the second period of time is selected according to a second duty cycle.

19. The method of claim 18, further comprising determining the first duty cycle according to a first output voltage and a first output current.

20. The method of claim 19, further comprising determining the second duty cycle according to a second output voltage and a second output current.

21. The method of claim 20, wherein the second duty cycle is determined to be about 30% and the first duty cycle is determined to be about 30%.

22. The method of claim 20, wherein the second duty cycle is determined to be about 60% and the first duty cycle is determined to be about 5%.

23. The method of claim 16, further comprising adjusting the first time period and the third time period according to modified output requirements.

* * * * *